United States Patent [19]
Hirota et al.

[11] Patent Number: 5,764,290
[45] Date of Patent: Jun. 9, 1998

[54] FLANGE-BACK ADJUSTING METHOD AND APPARATUS FOR A VIDEO CAMERA USING AN INNER FOCUS LENS ASSEMBLY

[75] Inventors: Katsuaki Hirota, Kanagawa; Yoshikazu Ochi, Chiba; Makibi Nakamura, Kanagawa, all of Japan

[73] Assignee: Sony Corporation, Tokyo, Japan

[21] Appl. No.: 345,730

[22] Filed: Nov. 22, 1994

[30] Foreign Application Priority Data

Nov. 26, 1993 [JP] Japan .................................. 5-321406
Feb. 25, 1994 [JP] Japan .................................. 6-053131

[51] Int. Cl.⁶ .................................................. H04N 5/232
[52] U.S. Cl. .................... 348/358; 348/347; 348/345; 250/201.7
[58] Field of Search .................................. 348/358, 347, 348/335, 345; 354/402, 195.12, 195.1; 250/201.2, 201.8, 201.7; 359/676, 675, 698, 701; H04N 5/232

[56] References Cited

U.S. PATENT DOCUMENTS 4,949,087  8/1990  Miyazawa ............................. 341/16

FOREIGN PATENT DOCUMENTS 564351  10/1993  European Pat. Off. ....... H04N 5/232

*Primary Examiner*—Wendy Garber
*Assistant Examiner*—Andrew B. Christensen
*Attorney, Agent, or Firm*—Jay H. Maioli

[57] ABSTRACT

Flange-back adjustment in a video camera using an inner focus lens assembly is done by detecting a position on the top of an actual zoom tracking curve and by detecting positions of end points of a variater on the basis of the top. Positions of the end points are presumed by a calculation from a position of the variater before arrival at an end. That is, by using the position of the variater in focus as a result of a movement of a focus lens from the top, and a ratio of a distance from the position of the variater in focus to one of the end points versus a distance from the position of the variater in focus to the other of the end points, positions of the end points are obtained.

6 Claims, 7 Drawing Sheets

FLANGE-BACK ADJUSTING METHOD AND APPARATUS FOR A VIDEO CAMERA USING AN INNER FOCUS LENS ASSEMBLY

BACKGROUND OF THE INVENTION

1. Field of the Invention

This invention relates to a method and an apparatus for adjusting a flange-back of a video camera using an inner focus lens assembly.

2. Prior Art

Video cameras using an inner focus lens system with a fixed front lens have been known. The inner focus lens system is a variable focus lens system in which the imaging surface moves as the focal distance varies. Any video camera using such an inner focus lens system positionally controls a focus lens along a cam curve to follow a movement of a variater lens so as to maintain a focussed status while the variater lens is moved for zooming (see, for example, U.S. Pat. No. 5,212,593). Such control is called zoom tracking control.

The positional relationship between the variater lens and the focus lens, on which an image is to be focussed, is shown by a zoom tracking curve as shown in FIG. 1. The cam curve is made based on the curve of FIG. 1. In FIG. 1, the abscissa indicates positions of the variater lens while the ordinate indicates the feeding amount of the focus lens. T1, T2 and T3 represent cam curves for objects 1 m, 2 m, and infinity distant. If the focus lens is moved along one of the curves when the variater lens is moved, a focussed status is maintained.

Due to an actual lens mounting position of a CCD image pickup device or inevitable manufacturing varieties among individual lenses, more or less errors are produced in positions of the WIDE end and the TELE end and in the distance between these ends. This may cause an error in the absolute position on the cam curve and may disable a proper zoom tracking control. It is therefore necessary, with a video camera using an inner focus lens system, to determine a WIDE end and a TELE end serving as references on the cam curve and a reference position for the focus lens. Such adjustment for determining the WIDE end and the TELE end as references on the cam curve and the reference position for the focus lens in a video camera using an inner focus lens system is called flange-back adjustment. The flange-back adjustment originally pertains to adjusting the flange-back focus to compensate for differences in mounting position of CCD image-pickup devices among different video camera sets. In video cameras using an inner focus lens system, however, flange back adjustment pertains to adjustment for determining WIDE and TELE ends serving as references on the cam curve and the reference position for the focus lens.

FIG. 2 is a flow chart of an existing flange-back adjustment, and FIG. 3 is a diagram showing an aspect of the adjustment (European Patent Application 0564351). As shown in FIG. 1, the tracking curves are steepest near the TELE end and have maxima at the two thirds distance, approximately, from the WIDE end to the TELE end. Near the maxima, the zoom tracking curves becomes nearly horizontal. Therefore, movements of the variater lens do not affect the focus in the proximity of the maxima. In contrast, at the TELE end, any error in position of the variater lens greatly affects the focus. This means that positional control of the focus is easier near the maxima while positional control of the variater lens is easier on the side of the TELE end. The existing flange-back adjustment shown in FIG. 2 uses it for adjustment.

Referring back to FIG. 2, the variater lens is first moved to position E1 which is on the maximum on the designed value. Because of a mounting error of the CCD image pickup device, the position E1 on the maximum on the designed value is offset from an actual maximum position of the actual zoom tracking curve (step ST51).

After the variater lens is set at the designed maximum E1, with the variater lens held at E1, the focus lens is moved to search for a position in focus. Namely, when the focus lens moves to position E2, it rides on the actual zoom tracking curve, and the system comes into focus. This position of the focus lens is stored (step ST52).

After that, the focus lens is moved by T, which is a predetermined moving amount from the maximum to the TELE end, and it is put on position E3 (step ST53).

Next, with the focus lens held there, the variater lens is moved to search for a position in focus. When the variater lens moves to position E4, it rides on the zoom tracking curve, and the system comes into focus. This position of the variater lens, where the position E4 in focus has been found, is stored as the TELE end. The TELE end, thus detected, is based on the maximum on the designed value, and has a difference from the actual TELE end (step ST54).

After the TELE end position is stored, the variater lens is moved by S, which is a predetermined value for the moving amount of the variater lens from the TELE end to the maximum, and placed on position E5 (step ST55).

Then the focus lens is moved into focus, and this position E6 of the focus lens is stored (step ST56).

Through the foregoing process, the maximum of the zoom tracking curve is detected, but this maximum is different from the actual maximum. It is determined whether the previously stored maximum and the last obtained maximum are within a predetermined value (step ST57).

If the previously stored maximum and the last obtained maximum are not within the predetermined value, control returns back to step ST53 to repeat similar processing using the last obtained maximum. By repeating such processing, a previously stored maximum and a last obtained maximum come within the predetermined value.

Entry of the previously stored maximum and the last obtained maximum within the predetermined value means a close approach to the actual maximum. When the difference from the actual maximum falls within a predetermined value, the focus lens is moved by a predetermined value U from the maximum of the focus lens, which has currently been obtained in the preceding steps, and brought to position E8. The predetermined amount U corresponds to the amount of movement of the focus lens from the WIDE end to the maximum (step ST58).

When the focus lens is moved by the predetermined value, a focal point is searched for by the variater, and position E9 in focus is determined as the WIDE end (step ST59).

As explained above, since the existing flange-back adjustment first takes reference to the maximum of the originally designed zoom tracking curve to determine the position of the TELE end, it includes a loop for adjustment from ST53 to ST57 to repeatedly search for the maximum of an actual zoom tracking curve and the TELE end, and hence takes a long time for adjustment.

OBJECT AND SUMMARY OF THE INVENTION

It is, therefore, an object of the invention to provide a tracking adjusting method which takes less time for adjustment.

According to the invention, there is provided a flange-back adjusting method for a video camera using an inner focus lens system to adjust an error between a pre-estimated zoom tracking curve and an actual zoom tracking curve, comprising the steps of: detecting a position on the maximum of an actual zoom tracking curve; and determining opposite end positions of a variater lens with reference to the maximum of the actual zoom tracking curve.

Since the invention detects the maximum of an actual zoom tracking curve and uses it to determine the TELE end and the WIDE end, it includes no loop for adjustment, and reduces the time for adjustment.

The above, and other objects, features and advantages of the present invention will become readily apparent from the following detailed description thereof which is to be read in connection with the accompanying drawings.

DESCRIPTION OF THE PREFERRED EMBODIMENTS

An embodiment of the invention will be described below with reference to the drawings. The invention, as referred to above, is applied to a video camera using an inner focus lens system to adjust its flange-back. For flange-back adjustment, the invention first obtains the top of an actual zoom tracking curve, which contributes to a significant reduction of the time for adjustment.

Figure 1:
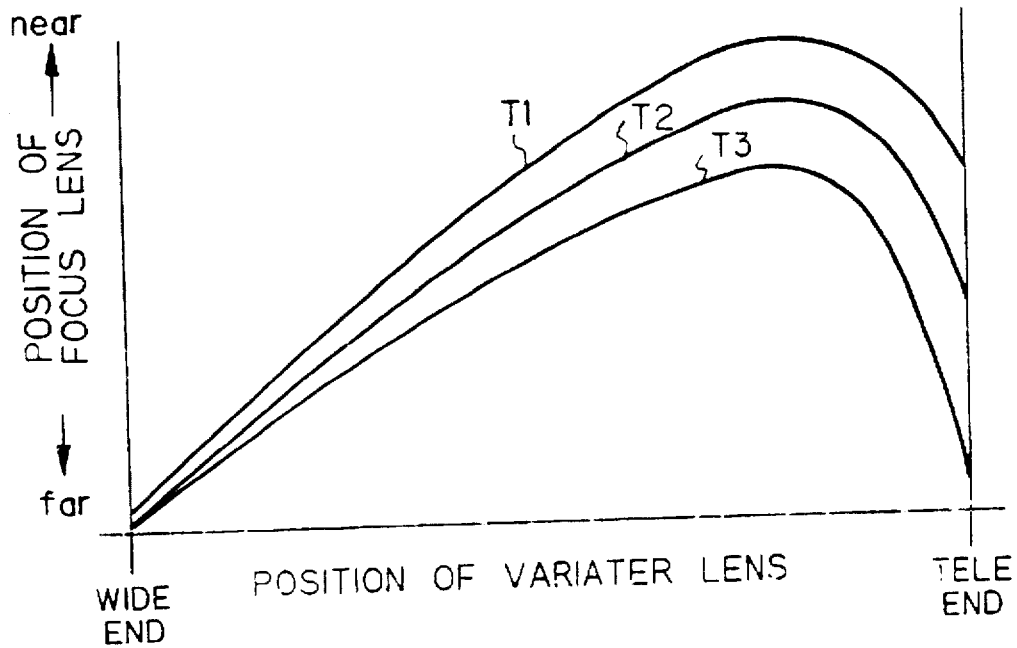
FIG. 1 is a schematic diagram of zoom tracking curves.
Figure 3:
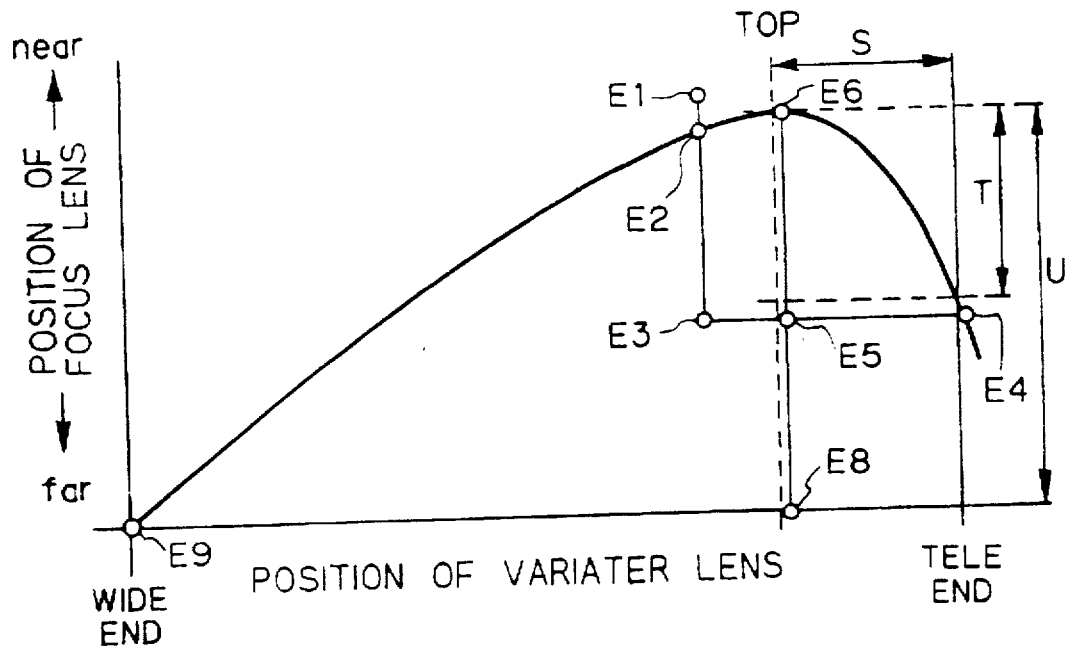
FIG. 3 is a schematic diagram used for explaining the existing flange-back adjustment of FIG. 2.
Figure 2:
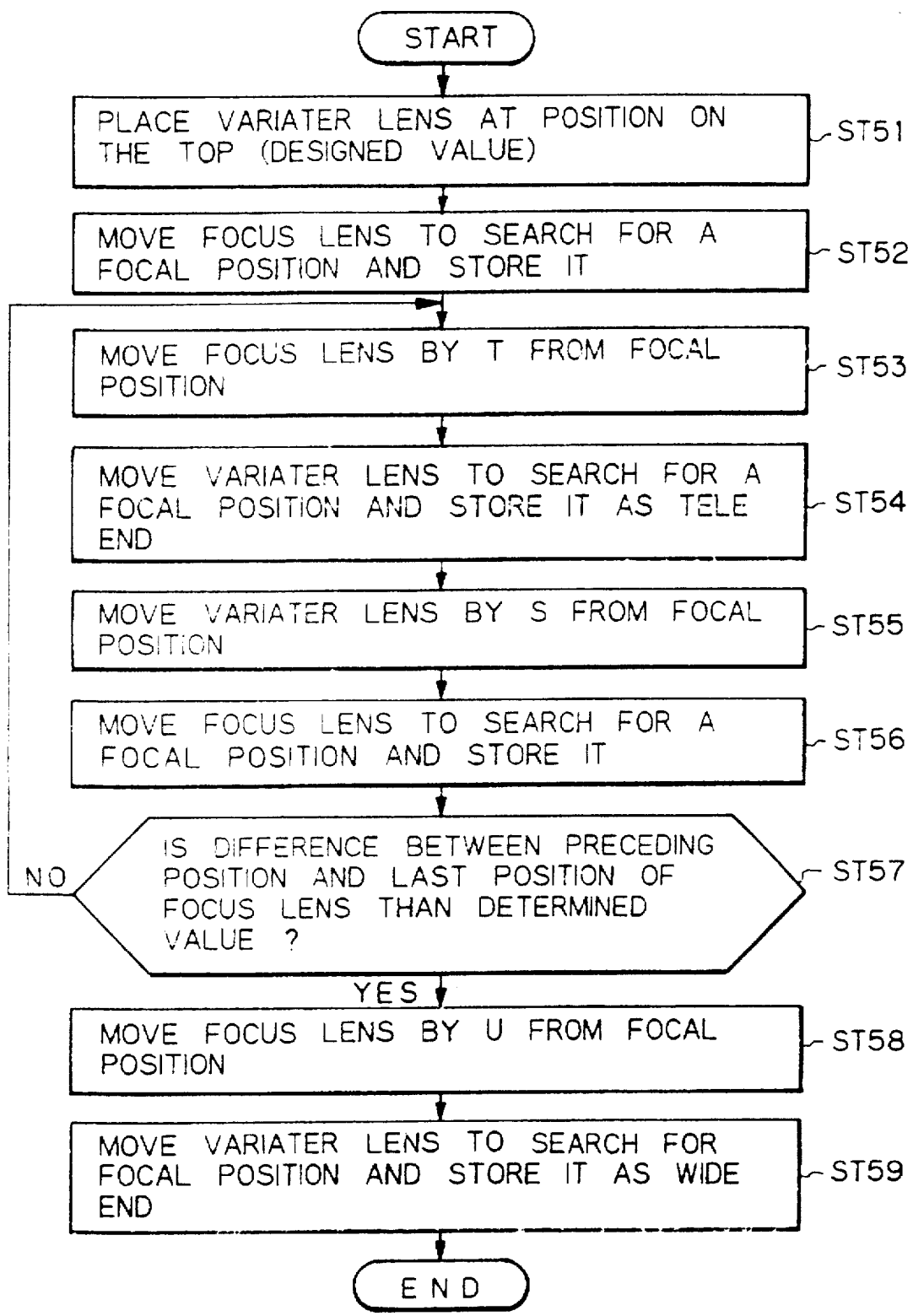
FIG. 2 is a flow chart of an existing flange-back adjustment.
Figure 4:
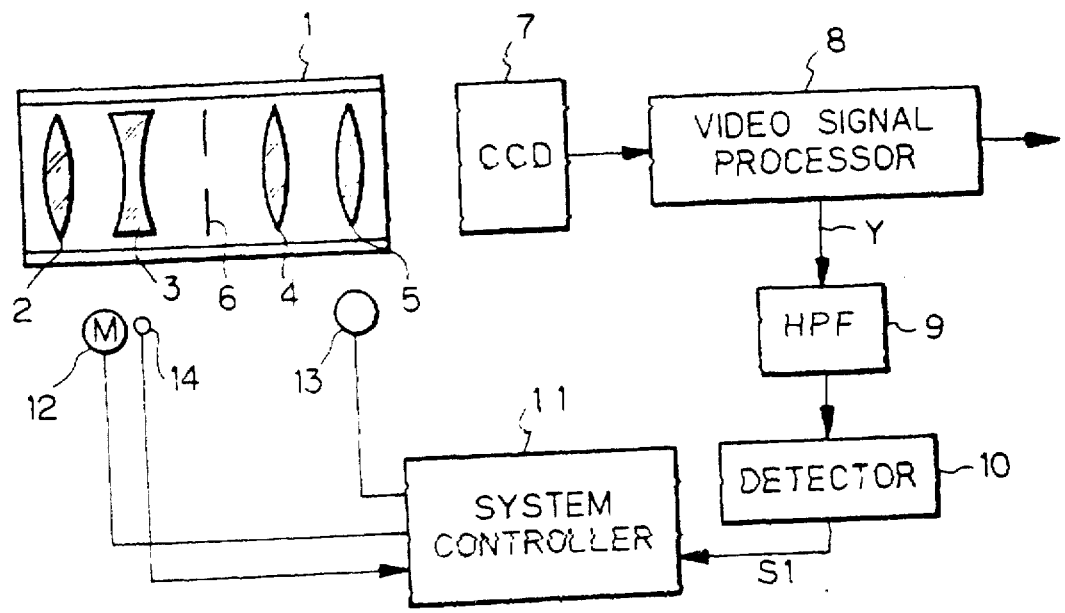
FIG. 4 is a block diagram of a video camera using an inner focus lens system to which the invention may be applied.

As shown in FIG. 4, the inner focus lens system 1 includes, from front to back, a fixed lens 2, a variater for zooming, a fixed lens 4, and a focus lens 5. An iris 6 is interposed between the variater lens 3 and the fixed lens 4.

A CCD image pickup device 7 is provided at a predetermined distance from the inner focus lens 1. Output of the CCD image pickup device 7 is supplied to a video signal processing circuit 8 which produces a video signal from the output signal of the CCD image pickup device 7. The video signal processing circuit 8 exerts a luminance signal Y whose high-band component is extracted by a high-pass filter. Output of the high-pass filter 9 is supplied to a detecting circuit 10. Detected from output of the detecting circuit 10 is the level of the high-band component of the luminance signal. Obtained from output of the detecting circuit 10 is a contrast signal S1 which is supplied to a system controller 11 and used to evaluate the focal status.

The variater lens 3 and the focus lens 5 can be moved by lens driving motors 12 and 13. Any position of the variater lens 3 is detected by a sensor 14, and its output is supplied to the system controller 11. To effect zooming by moving the variater lens 3, tracking control is done for the focus lens 5 to move and follow the variater lens 3 so as to maintain the focussed status. The system controller 11 is accommodated with a table for the tracking control, and moves the focus lens 5, following the movement of the variater lens 3.

The actual zoom tracking curve is different from the pre-estimated zoom tracking curve due to a manufacturing deviation in the mounting position of the CCD image pickup device 7. This is the reason why the flange-back adjustment is required.

Figure 6:
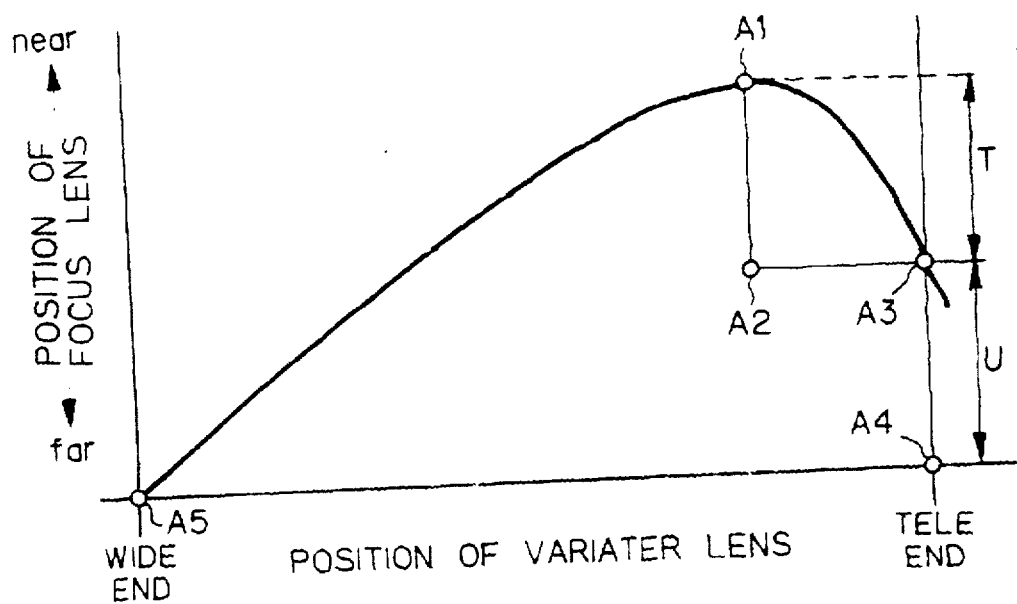
FIG. 6 is a schematic diagram used for explaining an embodiment of the invention.
Figure 5:
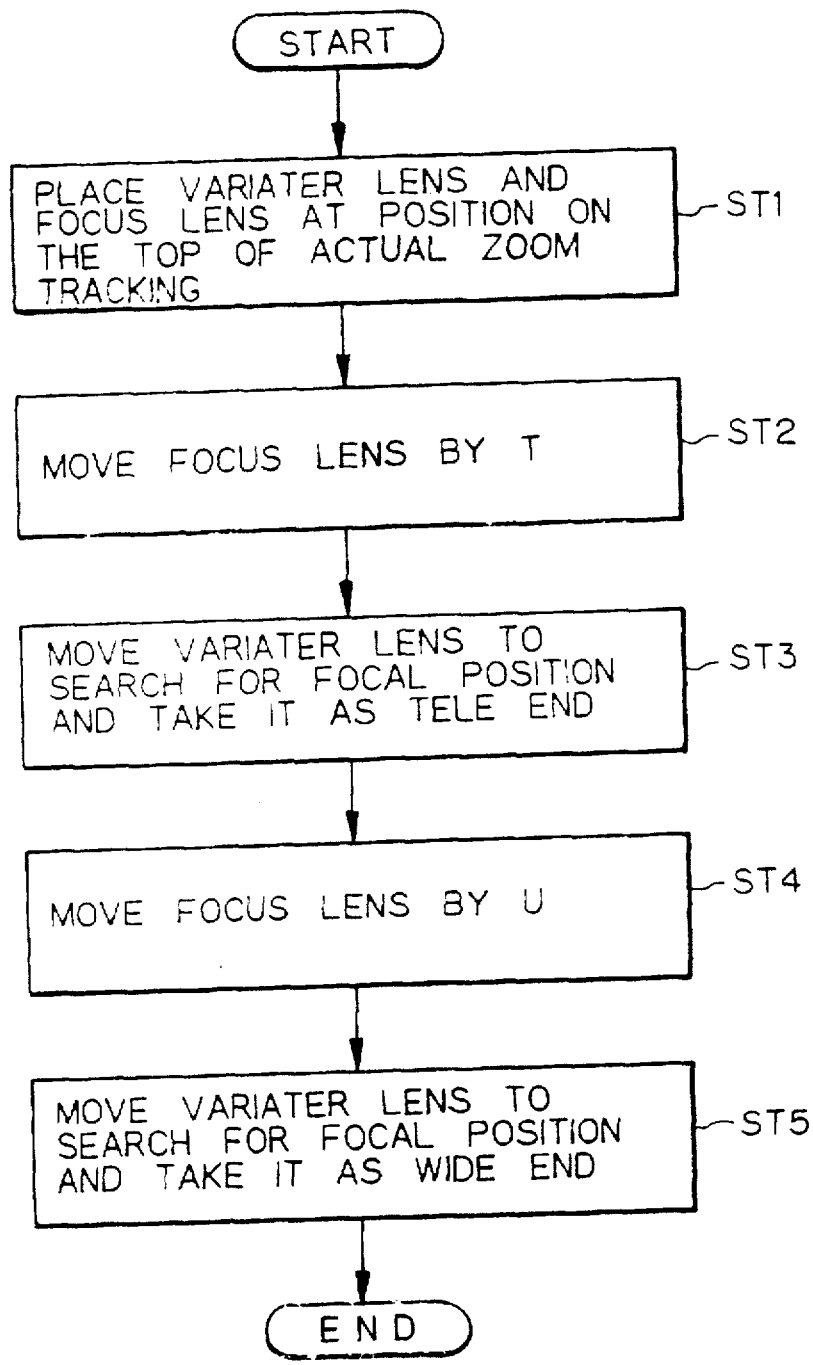
FIG. 5 is a flow chart used for explaining an embodiment of the invention.

FIG. 5 is a flow chart showing a flange-back adjusting method to which the invention is applied, and FIG. 6 is its explanatory diagram. Let the actual zoom tracking curve be as shown in FIG. 6 in which the abscissa indicates positions of the variater lens 3, the right side is the TELE side, and the left side is the WIDE side. The ordinate indicates positions of the focus lens 5, the upper side is the NEAR side, and the lower side is the FAR side. When the variater lens 3 and the focus lens 5 ride on the zoom tracking curve, the system is in focus.

As shown in FIG. 5, the flange-back adjusting method to which the invention is applied first detects the top of the zoom tracking curve, and then places the variater lens 3 and the focus lens 5 to the position of the top of the zoom tracking curve (step ST1). That is, at first, the variater lens 3 and the focus lens 5 are brought to position A1 in FIG. 6. How to detect the position of the top of the zoom tracking curve will be explained later.

Next, with the variater lens 3 held in the position, the focus lens 5 is moved to the FAR side by a determined amount T (step ST2). That is, the variater lens 3 and the focus lens 5 are brought to the position A2 of FIG. 6.

Then a focal position is searched for by the variater lens 3. As the variater lens 3 is moved from position A2 of FIG. 6 to the TELE side while holding the focus lens 5 stationary, it rides on the zoom tracking curve at point A3 and comes into focus. The position of the variater lens 3 in focus is determined as the TELE end (step ST3).

Next, the focus lens 5 is moved by a determined amount U. That is, the variater lens 3 and the focus lens 5 are brought to position A4 of FIG. 6 (step ST4).

After the focus lens 5 is moved by U, a focal point is searched for by the variater lens 3 while holding the focus lens 5 stationary. As the variater lens 3 is moved from A4 of FIG. 6 to the WIDE side, it rides on the zoom tracking curve at position A5, and the system comes into focus. The position of the variater lens 3 providing the focussed status is determined as the WIDE end (step ST5).

As described, the flange-back adjusting method, to which the invention is applied, first detects the top of the actual zoom tracking curve, and then determines the TELE end and the WIDE end, using the top as a reference. Therefore, it removes the loop for adjustment during flange-back adjustment, and hence reduces the time for the adjustment. The top of the actual zoom tracking curve can be detected as explained below.

Figure 7A:
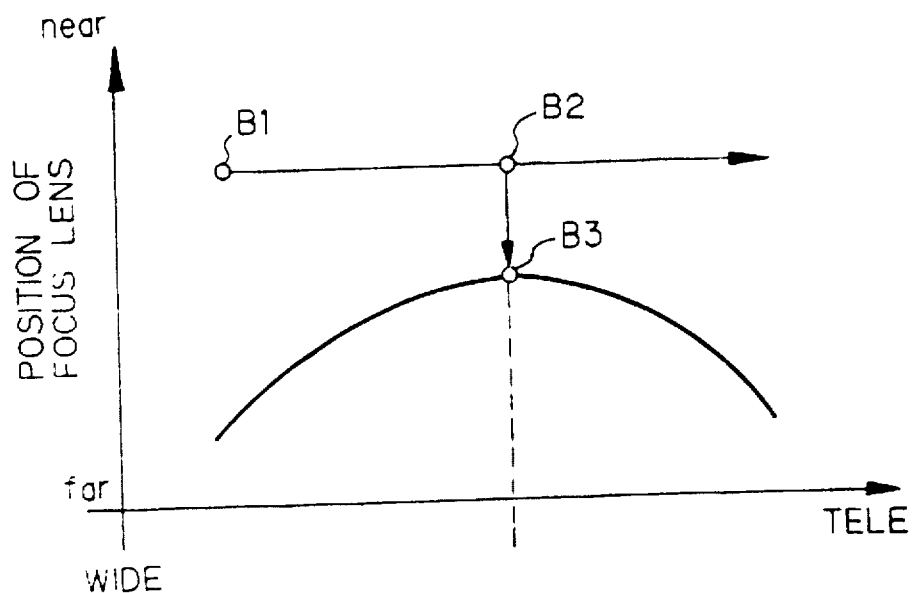
FIGS. 7A and 7B are schematic diagrams used for explaining a process for detecting the top of a zoom tracking curve.
Figure 7B:
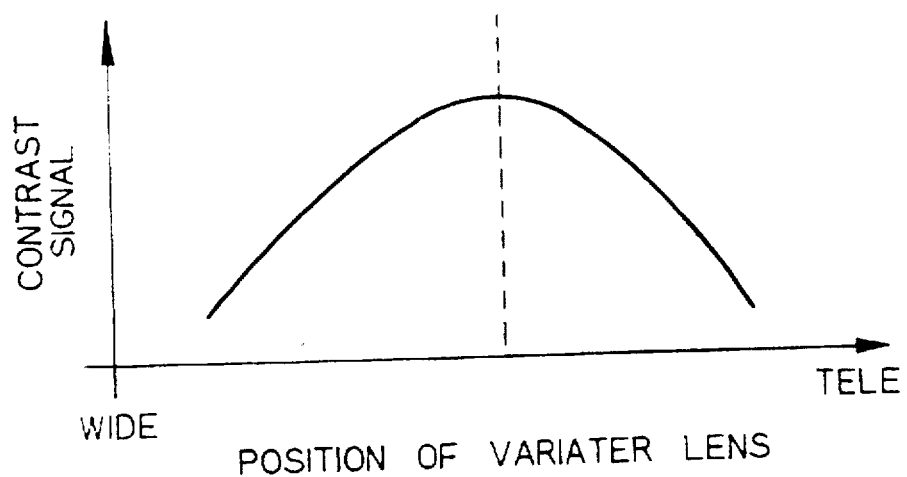

FIGS. 7A and 7B are explanatory diagrams of a method for detecting the top of the zoom tracking curve. As shown in FIGS. 7A and 7B, to take an initial position, the variater lens 3 is placed at an approximate position nearer to the WIDE side and the focus lens 5 at an approximate position nearer to the NEAR side than a position where the top of the zoom tracking curve would be. That is, the variater lens 3 and the focus lens 5 are initially placed on point B1 of FIG. 7A.

Next, with the focus lens 5 held there stationary, the variater lens 3 is moved from the initial position towards the TELE side to observe a contrast signal S1. The contrast signal S1 is obtained from output of the detecting circuit 10 in FIG. 4, and maximized in a focussed status and diminished as the system goes out of focus.

Therefore, as the variater lens 3 is moved for a search, the contrast signal S1 varies as shown in FIG. 7B. At point B2 where the position of the variater lens 3 shown in FIG. 7A comes to the top of the zoom tracking curve, deviation from the focal point becomes minimum, and the contrast signal S1 becomes maximum.

With the variater lens 3 held at position B2 maximizing the contrast signal S1, the focus lens 5 is moved in the FAR direction to search for a focussed position. Thus a position B3, the top of the zoom tracking curve, shown in FIG. 7A is obtained.

In the foregoing example, the variater lens 3 is moved for a search from the WIDE end towards the TELE end; however, it may be moved from the TELE end toward the WIDE end.

Figure 8A:
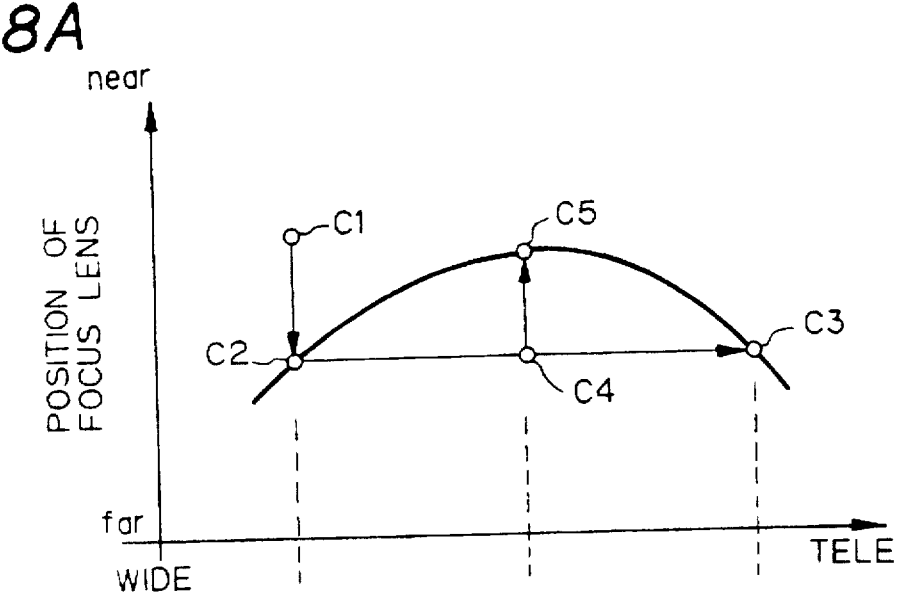
FIGS. 8A and 8B are schematic diagrams used for explaining another process for detecting the top of a zoom tracking curve.
Figure 8B:
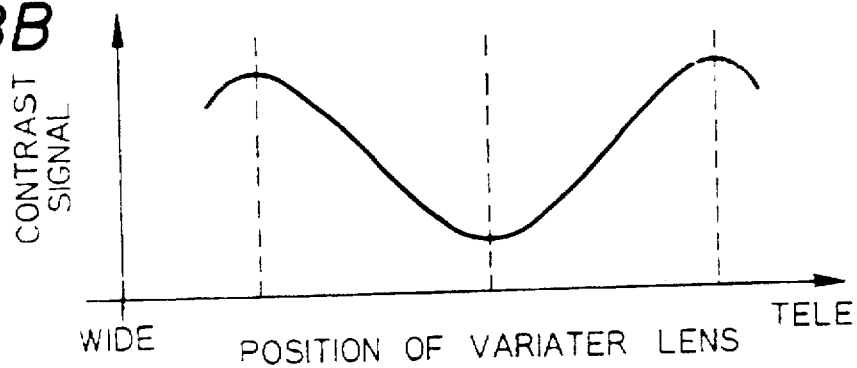

FIGS. 8A and 8B depict another method for detecting the top of the zoom tracking curve.

As shown in FIGS. 8A and 8B, to take an initial position, the variater lens 3 is placed on an approximate position nearer to the WIDE side and the focus lens 5 on an approximate position nearer to the NEAR side than a position where the top of the zoom tracking curve would be. That is, the variater lens 3 and the focus lens 5 are initially placed on point C1 of FIG. 8A.

Next, with the variater lens 3 held stationary there, the focus lens 5 is moved to search for a focussed position. While the focus lens 5 is moved toward the FAR side, it rides on the tracking curve at point C2 where the contrast signal S1 is maximized as shown in FIG. 8B, which provides a focussed status.

Next, with the focus lens 5 held there stationary, the variater lens 3 is moved in the TELE direction to search for a focussed position. While the variater lens 3 is moved in the TELE direction, it again rides on the zoom tracking curve at C3 where the contrast signal S1 is maximized, which provides a focussed status.

While the variater lens 3 is thus moved, the contrast signal S1 is observed. When the variater lens 3 comes to position C4 which is the top of the zoom tracking curve, the deviation from the focussed position is maximized as shown in FIG. 8A. As a result, the contrast signal S1 is minimized as shown in FIG. 8B.

After the variater lens 3 is moved to position C4 minimizing the contrast signal S1, the focus lens 5 is moved to the NEAR side to search for a focal point. When the focus lens 5 comes to point C5, a focussed status is established, and the top of the zoom tracking curve is obtained from this position.

Also in this case, the variater lens 3 may be moved in the opposite direction to search from the TELE side to the WIDE side.

Figure 9:
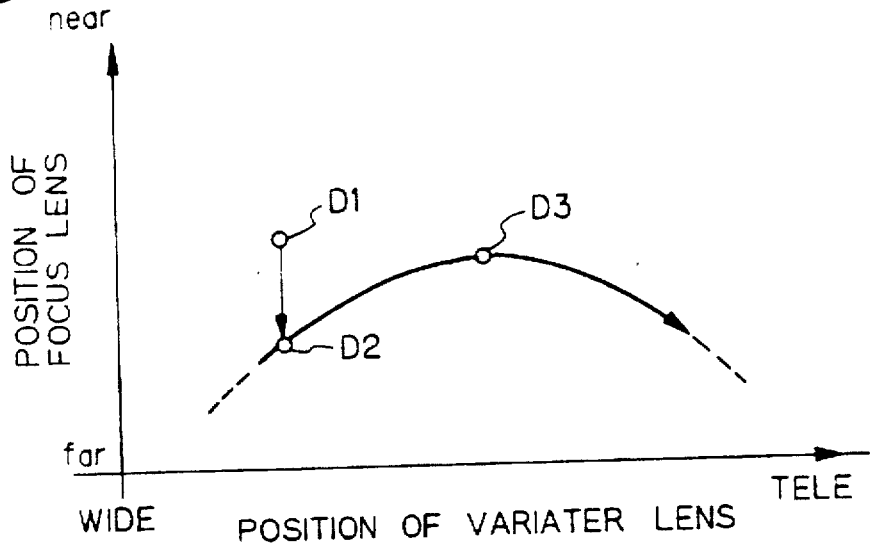
FIG. 9 is a schematic diagram used for explaining still another process for detecting the top of a zoom tracking curve.

FIG. 9 is a diagram for explaining still another method for detecting the top of the zoom tracking curve. To take an initial position, the variater lens 3 is moved to an approximate position nearer to the WIDE side and the focus lens 5 to an approximate position nearer to the NEAR side than a position where the top of the zoom tracking curve would be. That is, the variater lens 3 and the focus lens 5 are initially placed on point D1 of FIG. 9. After that, the focus lens 5 is moved to search for a focal point D2.

Next, while the variater lens 3 is moved to the TELE side, the focus lens 5 is moved to always maintain a focussed status by an automatic focus control. Meanwhile, the position of the focus lens 5 is observed. As the variater lens 3 is moved from point D2 to the TELE side, the focus lens 5 moves following the zoom tracking curve, first to the NEAR side, then to the FAR side. Determining position D3 where the focus lens is nearest to the NEAR side, the top of the zoom tracking curve is determined from position D3.

Also in this case, another algorithm may be employed to move the variater lens 3 to search from the TELE side to the WIDE side.

In the flange-back adjustment described above, upon determining the WIDE end and the TELE end, the top of the zoom tracking curve is referred to for moving the variater lens therefrom by predetermined amounts corresponding to the WIDE and TELE ends in order to search for a focussed point and to determine these ends from the focussed point. In this case, however, if the designed values of the WIDE end and the TELE end are close to mechanical ends of the lens, then the variater lens may abut a mechanical end of the lens in the process of detecting a focussed point with the variater lens to determine the WIDE and TELE ends. In the case of using a step motor as an actuator of the variater lens, abutment of the variater lens with a mechanical end of the lens during adjustment may cause the motor to disengage and disables a proper adjustment. Particularly in the WIDE side, where the slope of the cam curve is moderate, there is a high possibility that the variater lens abuts a mechanical end of the lens.

In order to prevent the motor from disengaging even upon abutment of the variater lens with a mechanical end of the lens during adjustment, an approach would be to move the variater lens at a low speed while slightly vibrating the focus lens in the process of detecting a focussed position and determining the WIDE end and the TELE end. This approach for adjustment takes a long time.

An alternative proposal by the present invention is to presume the WIDE end and the TELE end from a position taken by the variater lens before reaching the WIDE and TELE ends. Used for this presumption is the ratio between the distance from the position of the variater lens in a focussed status established by a movement of the focus lens from the top of the cam curve to one of the ends and the distance from the position of the variater lens in a focussed status to one of the other of the ends. This approach can prevent the variater lens from abutting a mechanical end of the lens during adjustment.

Figure 10:
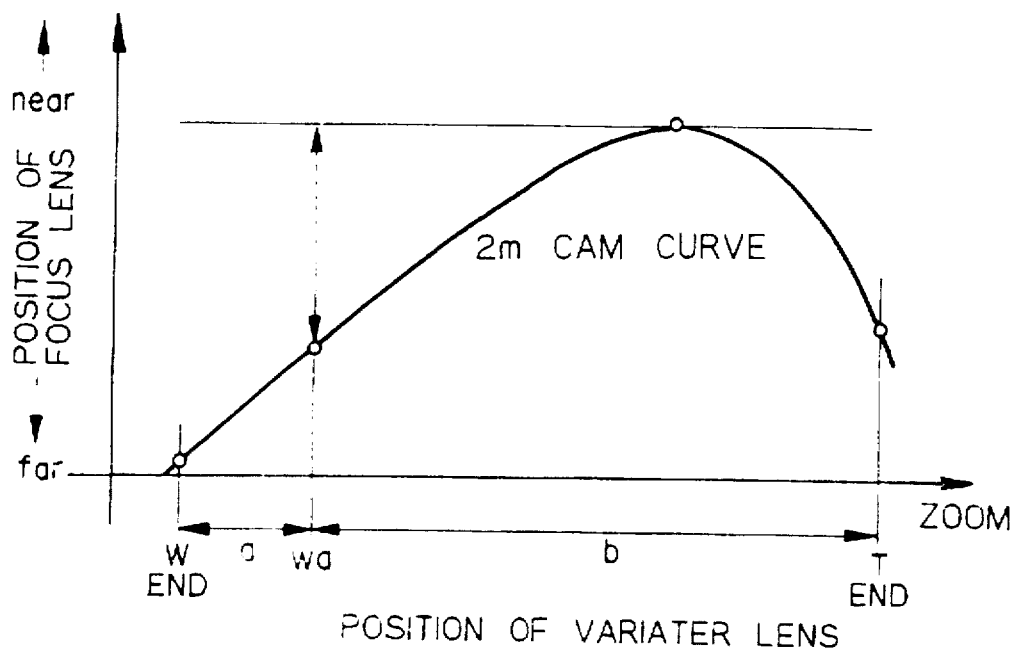
FIG. 10 is a schematic diagram used for explaining a process for detecting end points.

That is, as shown in FIG. 10, position Wa in a focussed status established by the variater lens 3 is first detected by moving the focus lens 5 by a determined amount FCwa from the maximum of the cam curve. Next obtained are distance a from the WIDE end to position Wa and distance b from position Wa to the TELE end, and their ratio (a/b) is stored.

There are differences between respective sets in distance a from the WIDE end to position Wa and in distance b from position Wa to the TELE end. Their ratios (a/b), however, become approximately equal to a originally obtained one. Therefore, by detecting position Wa in a focussed status established by the variater lens 3 by moving the focus lens 5 by a amount FCwa from the top of the cam curve, and by using the originally obtained ratio (a/b), position W of the WIDE end can be obtained. That is, position W of the WIDE end is $$W = Wa - (T - Wa) \times (a/b) \quad (1)$$

where W is the position of the WIDE end, and T is the position of the TELE end.

Figure 11:
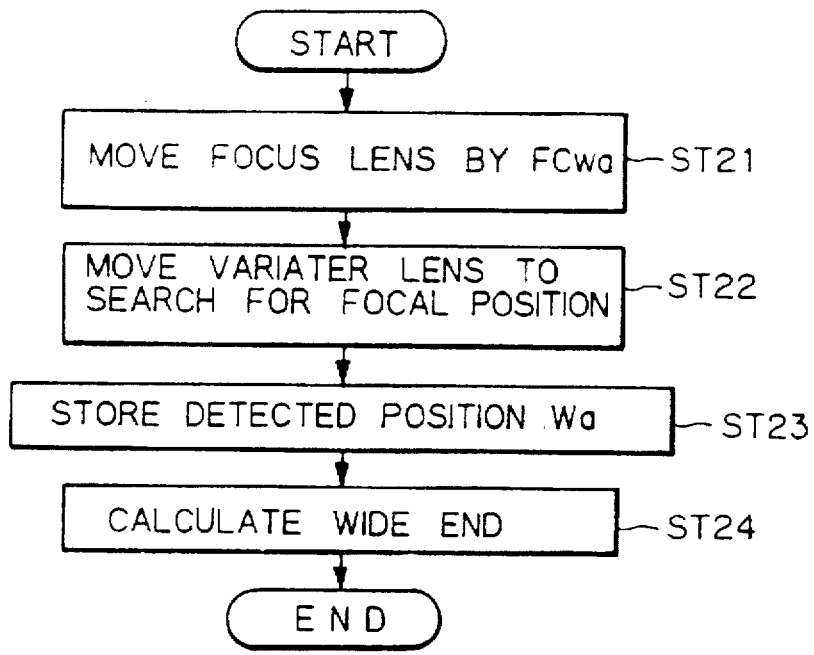
FIG. 11 is a flow chart used for explaining the process for detecting end points.

FIG. 11 is a flow chart of obtaining the WIDE end in the foregoing process. As shown in FIG. 11, the focus lens 5 is first moved by a determined amount FCwa from the top of the zoom tracking curve (step ST21). The determined amount FCwa is an amount to locate the focus lens 5 in a slightly more forward position (nearer to the NEAR side) than its focussed position in the WIDE side.

Next, the variater lens is moved to detect a focussed position (step ST22), and the position of the variater lens 3 in the focussed status is stored as detected position Wa (step ST23). Based on the detected position Wa, the distance to the WIDE end is obtained. That is, on the basis of the above equation, position W of the WIDE end is obtained (step ST24).

When, in this manner, the end point is calculated from position Wa in focus detected by the variater lens in front of the end point, the variater lens less likely abuts a mechanical end of the lens during adjustment; however, accuracy in detection of end points decreases. That is, the detection error increases by a/b time the original detection error. Actually, however, since a:b=1:30 is sufficiently acceptable and since the detection error of the WIDE end is around 2 steps (30 μm), a presumed increase in error is 0.06 step (1 μm), nearly zero.

The process used in the foregoing example to detect the WIDE end by detecting a focussed point at a position before the WIDE end and by performing calculation from the position can also be used to detect the TELE end.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A flange-back adjusting method for adjusting an error between a pre-estimated zoom tracking curve and an actual zoom-tracking curve having a maximum in a video camera using an inner focus lens assembly, comprising the steps of:

detecting a contrast signal contained in an image pickup signal;

detecting a position corresponding to the maximum of the actual zoom tracking curve to obtain a detected position by one of recording a point of inflexion while said inner focus lens assembly moves along the actual zoom-tracking curve and applying a criterion relating solely to said magnitude of said contrast signal while said inner focus lens assembly moves across the actual zoom-tracking curve from positions in the vicinity of the maximum of the actual zoom-tracking curve; and determining a position for a selected end point of a variator lens having a first end point and a second end point on the basis of the detected position.

2. The flange-back adjusting method according to claim 1, wherein said step of determining the position of the selected end point of the variator lens comprises estimating the selected end point according to a calculation from positions of the variator lens before arrival at the selected end point by remaining on the actual zoom-tracking curve.

3. The flange-back adjusting method according to claim 1, wherein said step determining the position of the selected end point of the variator lens includes:

preliminarily detecting a position of the variator lens brought into focus by moving a focus lens by a predetermined amount from the maximum of the pre-estimated zoom tracking curve to obtain the ratio between a distance from said position of the variator lens in focus to the first end point and a distance from said position of the variator lens in focus to the second end point, then putting the variator lens in focus by moving the focus lens by a predetermined amount from the maximum of the actual zoom tracking curve, and detecting the focal position of the variator lens; and estimating the position of the selected end point by using the position of the variator lens brought into focus by moving the focus lens from the maximum of the actual zoom tracking curve, and the ratio between the distance from said position of the variator lens in focus to the first end point and the distance from said position of the variator lens in focus to the second end point, which is substantially equal to the ratio originally obtained.

4. A flange-back adjusting apparatus for adjusting an error between a pre-estimated zoom tracking curve and an actual zoom-tracking curve having a maximum in a video camera using an inner focus lens assembly, comprising:

contrast signal detecting means for detecting a contrast signal contained in an image pickup signal;

means for moving said inner focus lens assembly along the actual zoom-tracking curve by ensuring that said inner focus lens assembly moves along a curve on which a magnitude of said contrast signal is maximized;

means for detecting a position at the maximum of the actual zoom tracking curve by one of recording a point of inflexion while said inner focus lens assembly moves along the actual zoom-tracking curve and applying a criterion relating solely to said magnitude of said contrast signal while said inner focus lens assembly moves across the actual zoom-tracking curve from positions in the vicinity of the maximum of the actual zoom-tracking curve; and means for determining positions of end points of a variator lens having a first end point and a second end point on the basis of the maximum of the actual zoom tracking curve.

5. The flange-back adjusting apparatus according to claim 4, wherein said means for determining positions of end points of the variator lens estimates the first and second end points according to calculation from positions of the variator lens before arrival at the first and second end points by remaining on the actual zoom-tracking curve.

6. The flange-back adjusting apparatus according to claim 4, wherein said means for determining positions of end points of the variator lens includes:

means for preliminarily detecting a position of the variator lens brought into focus by moving a focus lens by a predetermined amount from the maximum of the pre-estimated zoom tracking curve to obtain the ratio between a distance from said position of the variator lens in focus to the first end point and a distance from said position of the variator lens in focus to the second end point, means for putting the variator lens in focus by moving the focus lens by a predetermined amount from the maximum of the actual zoom tracking curve and for detecting the focal position of the variator lens; and means for estimating the positions of the end points by using the position of the variator lens brought into focus by moving the focus lens from the maximum of the actual zoom tracking curve, and the ratio between the distance from said position of the variator lens in focus to the first end point and the distance from said position of the variator lens in focus to the second end point, which is substantially equal to the ratio originally obtained.

* * * * *